US012008457B1

(12) United States Patent
Isik et al.

(10) Patent No.: US 12,008,457 B1
(45) Date of Patent: Jun. 11, 2024

(54) CONVOLUTIONAL NEURAL NETWORK WITH POSITIONAL EMBEDDINGS FOR AUDIO PROCESSING

(71) Applicant: Amazon Technologies, Inc., Seattle, WA (US)

(72) Inventors: Mehmet Umut Isik, Menlo Park, CA (US); Ritwik Giri, Sunnyvale, CA (US); Neerad Dilip Phansalkar, Half Moon Bay, CA (US); Jean-Marc Valin, QC (CA); Karim Helwani, Mountain View, CA (US); Arvindh Krishnaswamy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 592 days.

(21) Appl. No.: 17/037,515

(22) Filed: Sep. 29, 2020

Related U.S. Application Data

(60) Provisional application No. 63/067,826, filed on Aug. 19, 2020.

(51) Int. Cl.
*G06N 3/045* (2023.01)
*G06N 3/082* (2023.01)
*G10L 15/16* (2006.01)

(52) U.S. Cl.
CPC ............ *G06N 3/045* (2023.01); *G06N 3/082* (2013.01); *G10L 15/16* (2013.01)

(58) Field of Classification Search
CPC ......... G06N 3/045; G06N 3/082; G10L 15/16
USPC .......................................................... 706/25
See application file for complete search history.

(56) References Cited

U.S. PATENT DOCUMENTS 10,991,379 B2 * 4/2021 Hijazi ................. H04N 21/4394
2020/0075148 A1 * 3/2020 Nguyen .................... G06N 3/08
2021/0383538 A1 * 12/2021 Deasy ................... A61B 6/5211

FOREIGN PATENT DOCUMENTS

WO    WO-2021229197 A1 *  11/2021

OTHER PUBLICATIONS

Tan et al. "Learning Complex Spectral Mapping With Gated Convolutional Recurrent Networks for Monaural Speech Enhancement", IEEE/ACM Transactions on Audio, Speech, and Language Processing, vol. 28, 2020 (Year: 2020).*
Pandey et al., "TCNN: Temporal Convolutional Neural Network for Real-Time Speech Enhancement in the Time Domain", ICASSP 2019 (Year: 2019).*
Bing-yin Xia, et al., "Speech Enhancement with Weighted Denoising Auto-Encoder", Interspeech 2013, 2013, pp. 1-5.
Yong Xu, et al., "A Regression Approach to Speech Enhancement Based on Deep Neural Networks", IEEE/ACM Transaction on Audio, Speech, and Language Processing, vol. 23, No. 1, Jan. 2015, pp. 7-19.

(Continued)

*Primary Examiner* — Tsu-Chang Lee
(74) *Attorney, Agent, or Firm* — S. Scott Foster; Kowert, Hood, Munyon, Rankin & Goetzel, P.C.

(57) ABSTRACT

Audio processing may be performed with a convolutional neural network that includes positional embeddings. Audio data may be received at an audio processing system. A convolutional neural network that concatenates frequency-positional embeddings at an input layer may be used to process the audio data. A result of processing the audio data through the convolutional neural network may be used to perform an audio processing task.

20 Claims, 7 Drawing Sheets

(56) References Cited

OTHER PUBLICATIONS

Felix Weninger, et al., "Speech Enhancement with LSTM Recurrent Neural Networks and its Application to Noise-Robust ASR", In International Conference on Latent Variable Analysis and Signal Separation, Springer, 2015, pp. 91-99.

Kun Han, et al., "Learning Spectral Mapping for Speech Dereverberation and Denoising", IEEE/ACM Transactions on Audio, Speech and Language Processing, vol. 23, No. 6, Jun. 2015, pp. 982-992.

Ritwik Giri, et al., "Attention Wave-U-Net for Speech Enhancement", in 2019 IEEE Workshop on Applications of Signal Processing to Audio and Acoustics, Oct. 20-23, 2019, pp. 1-5.

Donald S. Williamson, et al., "Complex Ratio Masking for Monaural Speech Separation", Author Manuscript, IEEE/ ACM Transactions on Audio, Speech, and Language Processing, 24(3), Mar. 2016, pp. 1-27.

Jonathan Le Roux, et al., "Phasebook and Friends: Leveraging discrete representations for source separation", arXiv:1810.01395v2, Mar. 7, 2019, pp. 1-13.

Dario Rethage, et al., "A Wavenet for Speech Denoising", arXiv:1706.07162v3, Jan. 31, 2018, pp. 1-11.

Craig Macartney, et al., "Improved Speech Enhancement with the Wave-U-Net", arXiv:1811.11307v1, Nov. 27, 2018, pp. 1-5.

Francois G. Germain, et al., "Speech Denoising with Deep Feature Losses", arXiv:1806.10522v2, Preprint, Sep. 14, 2018, pp. 1-6.

Yi Hu, et al., "Evaluation of Objective Quality Measures for Speech Enhancement", in IEEE Transactions on Audio, Speech, and Language Processing, vol. 16, No. 1, Jan. 2008, pp. 229-238.

Yi Luo, et al., "Conv-TasNet: Surpassing Ideal Time-Frequency Magnitude Masking for Speech Separation", in IEEE/ ACM Transactions on Audio, Speech, and Language Processing, vol. 27, No. 8, Aug. 2019, pp. 1256-1266.

Se Rim Park, et al., "A Fully Convolutional Neural Network for Speech Enhancement", arXiv:1609.07132v1, Sep. 22, 2016, pp. 1-6.

Arsha Nagrani, et al., "VoxCeleb: a large-scale speaker identification dataset", arXiv:1706.08612v2, May 30, 2018, pp. 1-6.

Yan Zhao, et al., "Late Reverberation Suppression Using Recurrent Neural Networks With Long Short-Term Memory", IEEE, In International Conference on Acoustics, Speech and Signal Processing (ICASSP), 2018, pp. 5434-5438.

Chandan K.A. Reddy, et al., "The Interspeech 2020 Deep Noise Suppression Challenge: Datasets, Subjective Speech Quality and Testing Framework", arXiv preprint arXiv:2001.08662, 2020, pp. 1-5.

Bahareh Tolooshams, et al., "Channel-Attention Dense U-Net for Multichannel Speech Enhancement", arXiv:2001.11542v1, Jan. 30, 2020, pp. 1-5.

Xiaolong Wang, et al., "Non-local Neural Networks", In Proceedings of the IEEE conference on computer vision and pattern recognition, 2018, pp. 7794-7803.

Han Zhang, et al., "Self-Attention Generative Adversarial Networks", in Proceedings of the 36th International Conference on Machine Learning, PMLR 97, 2019, pp. 1-10.

Vassil Panayotov, et al., "LIBRISPEECH: An ASR Corpus Based on Public Domain Audio Books", In 2015 IEEE International Conference on Acoustics, Speech and Signal Processing (ICASSP), 2015, pp. 5206-5210.

Marco Jeub, et al., "A Binaural Room Impluse Response Database for the Evaluation of Dereverberation Algorithms", IEEE, In 2009 16th International Conference on Digital Signal Processing, 2009, pp. 1-5.

Jont B. Allen, et al., "Image method for efficiently simulating small-room acoustics", The Journal of the Acoustical Society of America, 65(4), 1979, pp. 943-950.

Jean-Marc Valin, et al., "A Hybrid DSP/Deep Learning Approach to Real-Time Full-Band Speech Enhancement", arXiv:1709.08243v3, May 31, 2018, pp. 1-5.

International Telecommunication Union, "Subjective evaluation of speech quality with a crowdsourcing approach", Recommendation p. 808, Jun. 2018, pp. 1-25.

International Telecommunication Union, "Perceptual evaluation of speech quality (PESQ): An objective method for end-to-end speech quality assessment of narrow-band telephone networks and speech codecs", Feb. 2001, pp. 1-29.

\* cited by examiner

CONVOLUTIONAL NEURAL NETWORK WITH POSITIONAL EMBEDDINGS FOR AUDIO PROCESSING

RELATED APPLICATIONS

This application claims benefit of priority to U.S. Provisional Application Ser. No. 63/067,826, entitled "CONVOLUTIONAL NEURAL NETWORK WITH POSITIONAL EMBEDDINGS FOR AUDIO PROCESSING," filed Aug. 19, 2020, and which is incorporated herein by reference in its entirety.

BACKGROUND

Neural network-based approaches have greatly improved the output quality of audio processing systems. For example, neural network-based approaches can be used for speech enhancement, audio source separation for speech, music, and other audio processing tasks. In speech enhancement, for instance, a neural network model may be used to estimate a magnitude gain for different spectrum bands in audio data.

Figure 1:
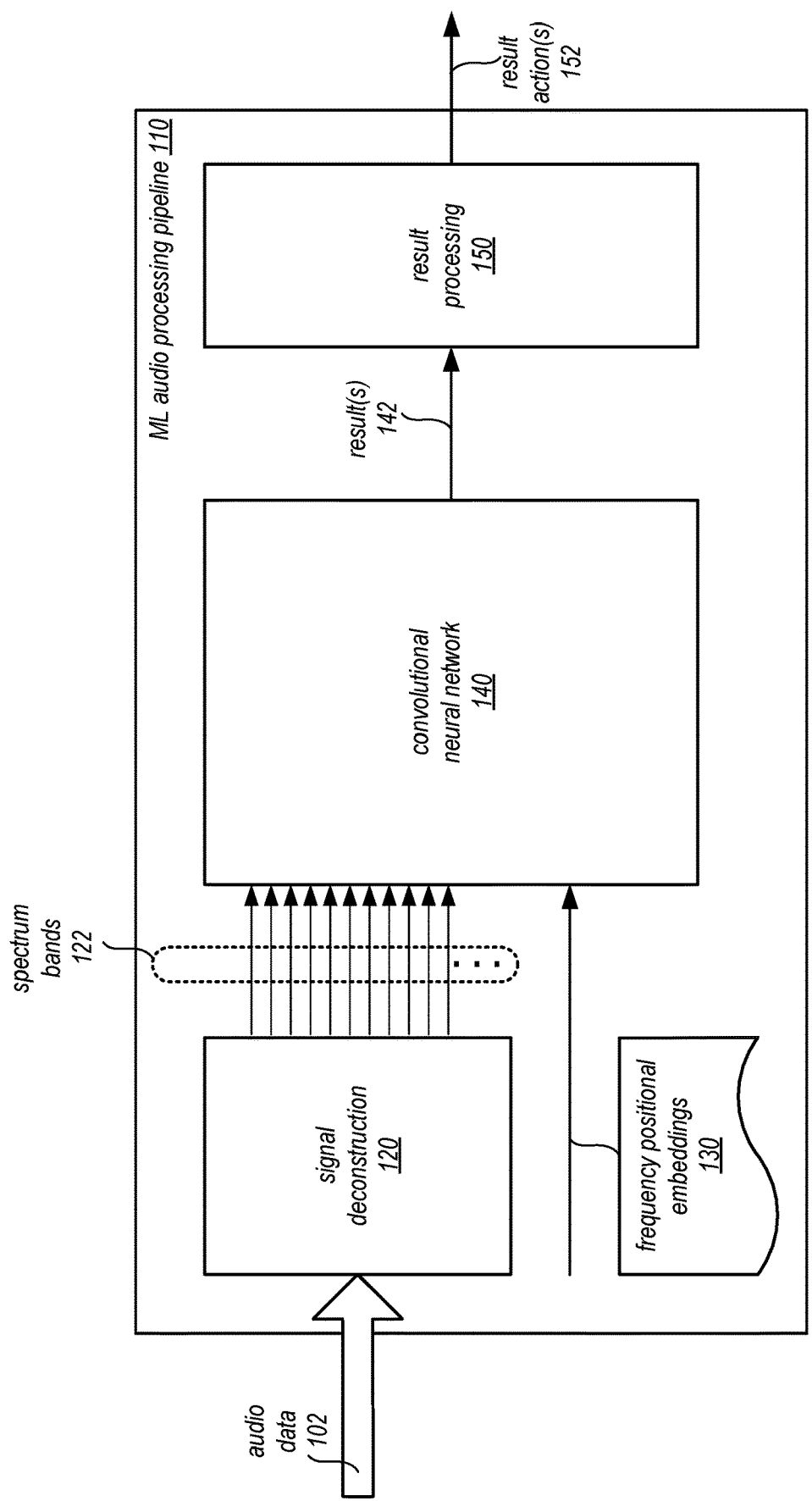
FIG. 1 illustrates a logical block diagram of a convolutional neural network that uses frequency-positional embeddings for audio processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for a convolutional neural network that uses frequency-positional embeddings for audio processing are described herein. Convolutional neural networks may be used, in various embodiments, to perform various audio processing tasks including audio enhancement (e.g., speech enhancement), source audio separation (e.g., for speech audio, music audio, etc.) and/or other audio processing tasks (e.g., audio classification or event detection). Such audio processing tasks may implicate various different considerations when implementing the convolutional neural network. For example, a convolutional neural network model may needs to be robust to the multitude of different speech, recording, and noise conditions present in real-world usage. Clean speech data (or other clean audio) for training may be difficult to obtain, with the biggest datasets coming from read material. In low signal-to-noise ratio (SNR) cases, larger convolutional neural network models may perform better, but subject to a tendency to fitting to the biases of the available dataset, decreasing robustness to other real-world conditions, making handling the various different speech, recording, and noise conditions more challenging as well as obtaining clean audio data for training. Moreover, the mismatch between human perception of sound quality and standard loss functions and metrics can make well-optimized models perform worse in human evaluation.

In various embodiments, for a convolutional neural network that uses frequency-positional embeddings for audio processing may be implemented to improve the performance of a convolutional neural network in light of the above considerations. Additionally, techniques for various architectural, data preparation, augmentation and loss-function innovations may be implemented, in some embodiments that also improve performance for audio processing tasks. Convolutional neural networks may be, in various embodiments, a machine learning model that implements a deep neural network of multiple layers of connected, artificial neurons (sometimes referred to as nodes), one layer (or more) of which may perform convolution operations on data. In convolutional neural network architectures, implementations in the time-frequency domain for audio processing tasks may rely on 1-dimensional (1D) or 2-dimensional (2D) convolutional neural networks, for instance. In the 1D architecture (e.g. ConvTASNet), kernels (e.g., a matrix that is a mask or otherwise used to filter, weight, or perform convolutions between input data and the matrix) may move in the time-direction, and may be fully connected in the frequency direction. Such kernels tend to have very large weight matrices in the early layers, where the architecture could benefit from a more hierarchical development of features. In 2D U-Net convolutional neural network models where kernels move in both the time and frequency directions, early layer activations may be blind to what frequency they operate in—even in the case when padding is used, these early features' receptive fields have not yet reached the edges of the time-frequency image. In various embodiments, a convolutional neural network with positional embeddings may incorporate the advantages of both options. For example, in some embodiments the convolutional neural network may be a 2D U-Net (with DenseNet blocks and self-attention) with small kernels, and can therefore develop features hierarchically, but can also take into account frequency information in early layers with the inclusion of frequency-positional embeddings, as discussed below.

FIG. 1 illustrates a logical block diagram of a convolutional neural network that uses frequency-positional embeddings for audio processing, according to some embodiments. Machine learning (ML) audio processing pipeline 110 may, in various embodiments, perform various audio processing tasks on received audio data 102. For example, as discussed above, audio processing tasks may include audio enhancement (e.g., speech enhancement), source audio separation (e.g., for speech audio, music audio, etc.), audio classification, and/or event detection/audio monitoring, among others. ML audio processing pipeline 110 may be implemented as part of various applications, systems, or services, such as trained and/or deployed as part of a machine learning service like machine learning service 210 in FIG. 2, discussed below.

ML audio processing pipeline may implement signal deconstruction 120, such as a short-time Fourier transform (STFT), in various embodiments, on received audio data 102. Signal deconstruction 120 may extract or determine spectrum bands 122 from audio data 102 for further processing through convolutional neural network 140. For example, convolutional neural network 140 may be implemented to provide an ideal mask ratio, as discussed below with regard to FIG. 4, in order to enhance speech by reducing noisy bands (e.g., non-speech audio). As noted above, convolutional neural network 140 may perform various other tasks, in some embodiments, including audio source separation, classification, event detection, and so on, using spectrum bands 122.

In various embodiments, frequency positional embeddings may be determined, generated, and/or provided, as indicated at 130, for processing spectrum bands 122 through convolutional neural network 140. In various embodiments, positional embeddings may be described as follows. For early convolutional layers to be able to do frequency-aware processing, a vector of frequency positional embeddings may be concatenated to each time (t) frequency (f) bin at the input layer of the model. In some embodiments, the frequency-positional embedding vector for a time-frequency bin centered at (t,f) may depend only on f and may be determined by:

$$p(t, f) = \left(\cos\left(\pi\frac{f}{F}\right), \cos\left(2\pi\frac{f}{F}\right), \ldots, \cos\left(2^{k-1}\pi\frac{f}{F}\right)\right)$$

where F may be the frequency bandwidth and k=10, in some embodiments. Note that vectors for frequency-positional embeddings may be determined differently, in other embodiments. For example, k may have a different value (e.g., a higher number to increase the granularity of embeddings or a lower number to decrease the number of embeddings). Other functions or operations, such as sin( ) instead of cos( ). In some embodiments, frequency positional embeddings may also be determined based on time t. As discussed below with regard to FIG. 5, in some embodiments, k may be a hyperparameter selectable for training convolutional neural network 140.

Result processing 150 may be implemented, in various embodiments, to perform various result action(s) 152 based on the result(s) 142 of processing the audio data 102 through convolutional neural network 140. For example, for audio enhancement tasks, result processing 150 may include various other operations, such as signal reconstruction (e.g., an inverse STFT) in order to generate an enhanced version of audio data 102. In some embodiments, result(s) 142 may provide a classification or event detection result and confidence value, which result processing 150 may handle in various ways according to the confidence value (e.g., by providing an indication of the classification or event if the confidence value exceeds a confidence threshold).

Please note that the previous description and illustration of an ML audio processing pipeline and convolutional neural networks with positional embeddings for audio processing are logical and thus is not to be construed as limiting as to the implementation of an audio enhancement system.

This specification begins with a general description of a provider network that implements multiple different services, including a machine learning service, which may implement convolutional neural network with positional embeddings for audio processing for perform various training and deploying machine learning models for various audio processing tasks (e.g., enhancing and transmitting enhanced audio). Then various examples of, including different components/modules, or arrangements of components/module that may be employed as part of implementing the services are discussed. A number of different methods and techniques to implement convolutional neural network with positional embeddings for audio processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
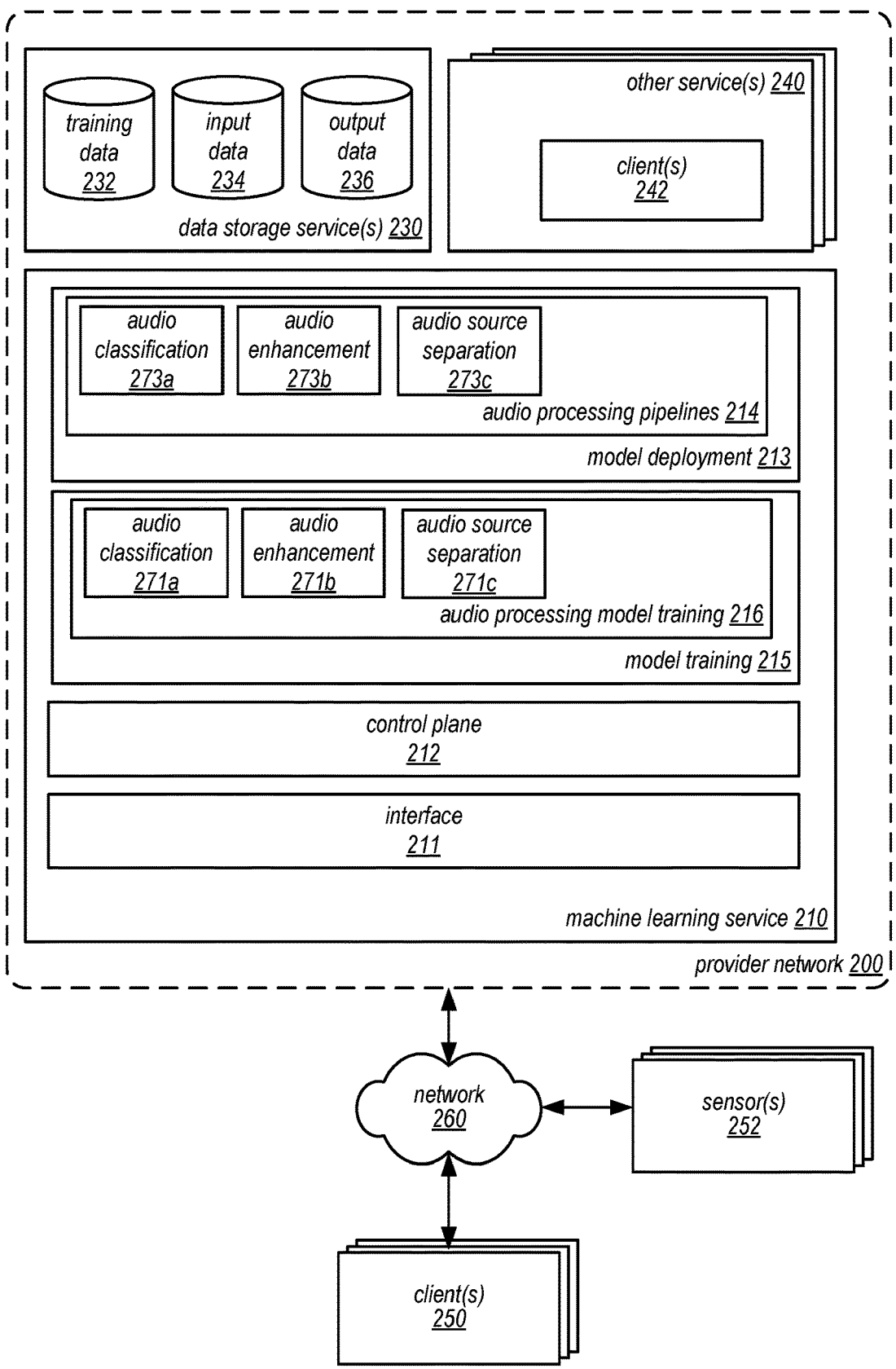
FIG. 2 illustrates an example provider network that offers a machine learning service that trains and deploys audio processing pipelines that implement a convolutional neural network that concatenates frequency-positional embeddings, according to some embodiments.

FIG. 2 illustrates an example provider network that offers a machine learning service that trains and deploys audio processing pipelines that implement a convolutional neural network that concatenates frequency-positional embeddings, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to train and deploy various machine learning models, such as various machine learning models for audio processing tasks. For example, machine learning service 210 may implement interface 211 (e.g., a graphical user interface, programmatic interface that implements Application Program Interfaces (APIs) and/or a command line interface) may be implemented so that a client application can submit an audio stream or other data stream captures by sensor(s) 252 and/or from input data 234 or data to be stored as output data 236 (e.g., enhanced audio) stored in storage service(s) 230, or other storage locations or sources within provider network 200 or external to provider network 200 (e.g., on premise data storage in private networks). Interface 211 may allow a client to cause audio processing model training and operations using the techniques discussed above with regard to FIG. 1 and below with regard to FIGS. 3-5, (e.g., as part of audio transmission, such as voice transmission like Voice over IP (VoIP)).

Machine learning service 210 may implement a control plane 212 to perform various control operations to implement the features of machine learning service 210. For example, control plane may monitor the health and performance of requests at different components audio transmission 213 and audio training 215 (e.g., the health or performance of various nodes implementing these features of machine learning service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Machine learning service 210 may implement model training 215, in various embodiments. Model training 215 may provide a fully managed model development and training environment. Model training 215 may implement audio processing model training 216, in various embodiments, to perform various audio processing tasks, such as audio classification 271a, audio enhancement 271b, and audio source separation 271c. For example, audio processing model training 216 may be implemented across one or multiple nodes that may host and perform various training algorithms for different types of machine learning models, including convolutional neural networks, as discussed above with regard to FIG. 1 and below with regard to FIGS. 3 and 4.

Machine learning service 210 may implement model deployment 213 which may support implementation of and/or various applications that include a trained machine learning model, such as a convolutional neural networks, as discussed above with regard to FIG. 1 and below with regard to FIGS. 3 and 4. Model deployment 213 may host various audio processing pipelines 214. Audio processing pipelines 214 may be deployed on one or more nodes, which may, upon receipt of audio data directed to the audio processing pipeline 214 (e.g., to a network endpoint or other resource identifier for machine learning service 210) to perform various audio processing tasks on the received audio data, such as audio classification 273a, audio enhancement 273b, audio source separation 273c, among others.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Various data used in or by machine learning service 210 may be stored in data storage services, such as input data 234 (e.g., input audio data), resulting output data 236 (e.g., enhanced or separated audio data). As discussed below with regard to FIG. 3, training data 232 (e.g., audio training data, labels, etc.) may be stored in storage service(s) 230.

Generally speaking, clients 250 may encompass any type of client that can submit network-based requests to provider network 200 via network 260, including requests for machine learning service 210 (e.g., a request to train, deploy, or invoke an a machine learning model for an audio processing task, etc.). For example, a given client 250 may include a suitable version of a web browser, or may include a plug-in module or other type of code module that can execute as an extension to or within an execution environment provided by a web browser. Alternatively, a client 250 may encompass an application that may make use of machine learning service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients may be internal to provider network such as client(s) 242, which may be implemented as part other service(s) 240 (e.g., a virtual compute service hosting an application that invokes a deployed audio processing pipeline 214).

In some embodiments, a client 250 may provide access to provider network 200 to other applications in a manner that is transparent to those applications. Clients 250 may convey network-based services requests (e.g., requests to interact with services like machine learning service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Sensor(s) 252 may, in various embodiments, collect, capture, and/or report various kinds of audio data, (or audio data as part of other captured data like video data), such as microphones. In some embodiments, some or all of audio processing tasks, like audio enhancement techniques, may be implemented as part of sensors 252 before transmission of audio to machine learning service 210.

Figure 3:
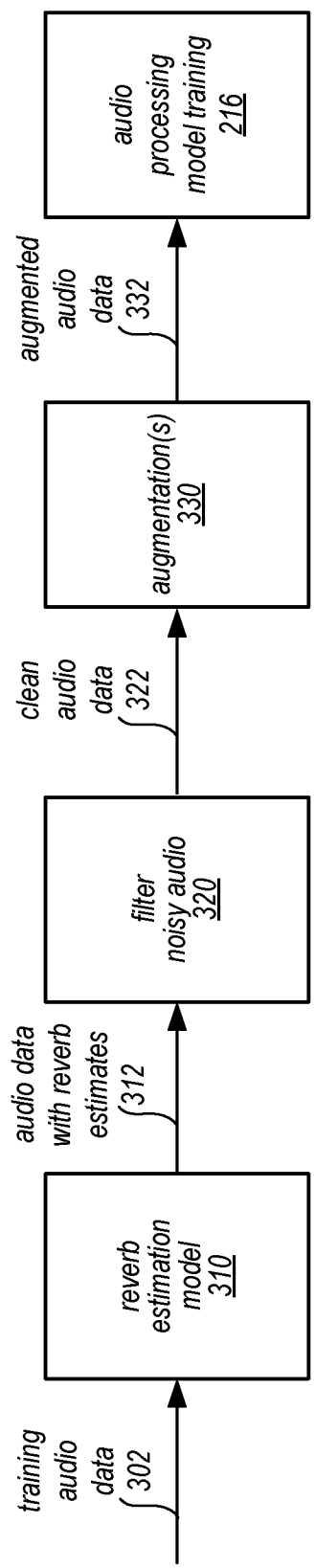
FIG. 3 illustrates a logical block diagram of generating training data for training audio processing pipelines, according to some embodiments.

FIG. 3 illustrates a logical block diagram of generating training data for training audio processing pipelines, according to some embodiments. Various pre-processing or other operations may be performed on training data for a convolutional neural network for performing audio processing tasks. For example, the amount of clean conversational data available for training may be scaled up by using a semi-supervised approach. The clean portion of a public data set (e.g., the LibriSpeech dataset) may be used, which contains data only from audio books, which is not conversational. Another type of data set, such as a larger data set like VoxCeleb dataset, on the other hand, may include television broadcasts, and therefore contains background music and effects, some of the data is also highly reverberant.

Training audio data 302 (e.g., taken from the example data sets above) may be processed through a reverberation estimation model 310 (which may be similar to the audio enhancement pipeline discussed below with regard to FIG. 4. For example, various embodiments of machine learning models may be trained speech enhancement models to isolate clean speech in large data set, like VoxCeleb2, and eliminate reverberant clips. For instance, as illustrated in FIG. 3, audio data with reverberation estimates 312 may be identified and filter, as indicated at 320. In this way, clean audio data 322 may be used for training, in some embodiments. Adding this processed clean speech dataset to the training data may, in various embodiments, improve the robustness of a convolutional neural network model, like the model discussed below with regard to FIG. 4, to conditions not well-represented, such as those found in a data set like LibriSpeech.

In various embodiments, augmentations 330 may be applied to training data. In this way, specific failure modes may be addressed to improve performance of the convolutional neural network model, in various embodiments. As indicated at 332, the augmented audio may be provided to audio processing model training 316 for training a convolutional neural network, like the one discussed below with regard to FIG. 4 or above with regard to FIG. 1.

For example, in various embodiments, different augmentations may be implemented, including the examples below. For example, an augmentation stack may include one (or more) of:

Equalization. Random high and low-shelf EQ filters. With center frequency chosen uniformly in logarithmic domain between 40 and 8000 Hz, gain between ±10 dB. Two random EQ bell-curves per datapoint, symmetric in log domain, with Q-value between 0.5 and 1.5; frequency chosen from the same interval as shelf EQ. Randomized and applied to both speech and noise separately.

Pitch shifts. Random resampling with ±10% of the original sample rate.

Clipping. Random clipping between 0.5 and 1 of the peak value of the signal, applied 10% of the time.

Empty buffer simulation. Random deletion of the first 0.5 to 1 of the input signal to simulate partially filled buffer in low-latency evaluation.

Level and Silence. Data points with foreground RMS less than −38 dBFS (dB relative to full-scale of 1.0) may be skipped and normalize each signal to have RMS value of −20 dBFS. A random volume down between −30 and 0 dB may be applied to the background, normalize the mix to −20 dBFS RMS, then apply a random amplification between −25 to 5 dB to everything. Silence as the foreground may be additionally used 3% of the time.

Band-limiting. To make the model robust to cases where the input signal is band-limited, a low pass filter may be applied at a frequency between 4 and 7 kHz, 2.5% of the time to background only, 2.5% of the time to foreground, and 5% of the time to both.

Reverberation. Used both as an augmentation and for datapoint creation as described below.

In various embodiments, synthetic reverberation may be applied, in some embodiments, in the dataset using a library of recorded and synthetically generated room impulse responses. Separate models may be trained to target the task with and without partial dereverberation. For non-dereverberating models, reverberation is added during training to the clean speech data as an augmentation before mixing. For training partially dereverberating models a faster decaying version of the reverberation may be added to the clean speech labels.

In various embodiments, reverberation may be described as follows. When adding reverberation, in each Room Impulse Response (RIR), the portion corresponding to the direct path, i.e. the 'first tap' may be identified, and scale and shift the RIR so that the first tap is at t=0 and it has height 1. It may be then that $x=s*(h_0+h>0)+n$ where $h_0$ is a single tap at time zero. A gain may be applied to all taps except the first tap by a value between −25 and 0 dB. Also, 60% of the time, reverberation may be added via the same impulse response to the noise signal as well, except that there is a separate downward scaling of the non-first tap. Hence, the model input becomes $$x=s*(h_0+\alpha h>0)+(n*(h_0+\beta_{>0}))$$

B real-recorded and synthetic room impulse responses (RIRs) may be used, in some embodiments. For real impulse responses, the Aachen Impulse Response dataset consisting of 214 MR recordings may be used, in some embodiments. For synthetic RIRs, a library of 10,000 RIRs may be generated using the image method, with random rectangular rooms with sizes from 2 to 10 meters with random reflection coefficients between 0.5 and 1.5. In some embodiments, impulse responses with RT60<0.8 s may be restricted. Impulse responses may be augmented with random resampling, which simulates changing room sizes with the same materials, and random exponential decays, which approximate changing uniform absorption levels of the room material, in some embodiments.

In some embodiments, no-dereverberation models, where, during training, reverberation is used simply as an augmentation, and the foreground speech label is y=s*h; and with partial-dereverberation may be used, where the label's room impulse response has the first 20 ms unaltered, and then made to decay quickly, to make RT60<0.2 s, by multiplying with an exponential decay function.

Figure 4:
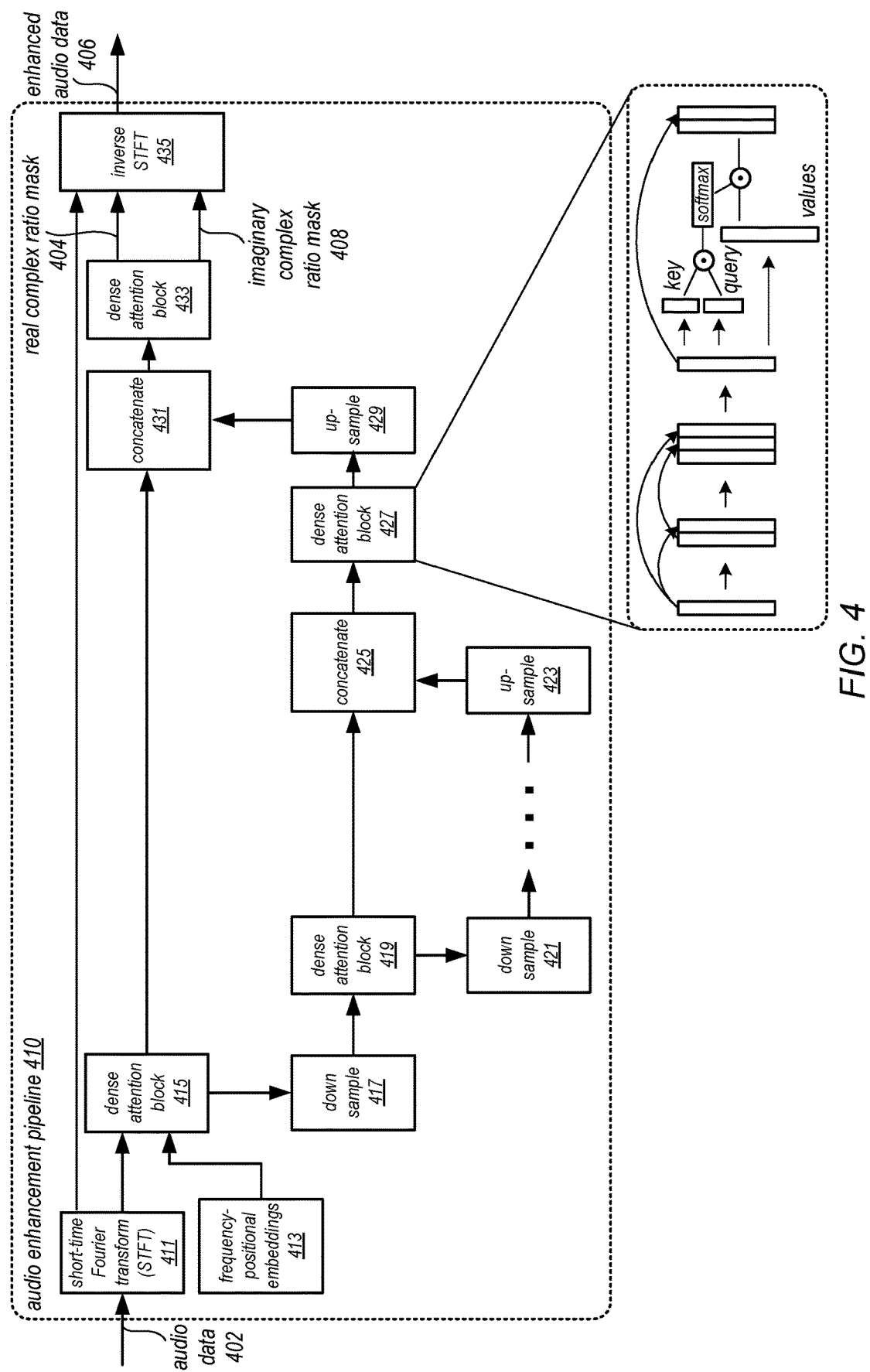
FIG. 4 illustrates a logical block diagram of an example an audio enhancement pipeline that implements a convolutional neural network that concatenates frequency-positional embeddings, according to some embodiments.

FIG. 4 illustrates a logical block diagram of an example an audio enhancement pipeline that implements a convolutional neural network that concatenates frequency-positional embeddings, according to some embodiments. Audio enhancement pipeline 410 may accept audio data 402 and generate spectrum bands. Frequency positional embeddings 413 (as discussed above with regard to FIG. 1) may also be provided. Dense attention block 415 may be a first portion of a convolutional neural network, such as a u-shaped neural network as illustrated in FIG. 4, which may concatenate the frequency-positional embeddings with time-frequency bins for spectrum bands at an input layer of dense attention block 415 (which may be similar to the depiction of dense attention block 427 illustrated in the breakout illustration below). Multiple levels may be implemented in the u-shaped convolutional neural network, as discussed below. For example, down sample 417 may take as input audio data processed through dense attention block 415, which may then pass the down-sampled audio data to dense attention block 419, and so on to down sample 421, until the lowest level of the convolutional neural network, which begins up sampling and concatenating data from levels (as indicated 423, 425, 427, 429, and 431) through a final dense attention block 433. A real complex ratio mask 404 may be the output of the model along with imaginary complex ratio mask 408 which are used to generate enhanced audio data 406 through performance of inverse STFT 435.

The dense attention blocks may aggregate information only in the time direction to increase efficiency during training and inference, in some embodiments. In various embodiments, L1 losses may be used to help deal with dataset noise. In some embodiments, a linear combination of two losses may be used. The first is a new L1-loss on magnitudes which may be biased to penalize underestimation of speech time-frequency bin magnitudes, as well as weighted towards high-frequencies, which makes the output of the trained model better preserve speech quality and avoid muffling. The second, is an L1 loss in the audio waveform domain, which may be back propagated though the STFT layer and complex multiplication to the estimated complex ratio mask values in the time-frequency domain, in some embodiments.

In various embodiments, let s be the clean speech audio signal and x=s*h+n be the same signal with added noise n and reverberated version s*h, which is convolved with a room impulse response h, and let y be the denoised and/or dereverberated target signal. The neural model N takes as input the STFT of the reverberant and noisy example s*h+n and estimates the complex ratio mask that would give the target signal estimate as:

$$\hat{y} = \text{/STFT}(N(\text{STFT}(x)) \cdot \text{STFT}(x))$$

In various embodiments, the architecture of the model illustrated in FIG. 4 may be described as follows. For the neural model N, may be a fully-convolutional 2D U-Net architecture with self-attention layers and 4-layer dense attention blocks (e.g., 415, 419, 427, 433) at each level. The convolutions may be causal in the time direction, but not in the frequency direction, so that padding is applied symmetrically in the frequency direction, but applied asymmetrically in the time direction so that it is only used at the edge of each layer corresponding to the early part in time, in various embodiments. This helps preserve the output quality at the late-portion of the output which may be used in a low-latency application as padding tends to hurt quality near edges and borders. Note that look-ahead may be provided by the average-pooling layers, which are used instead of max-pooling, in some embodiments.

As discussed above with regard to FIG. 3, various types of data sets and sources may be used for training, in various embodiments. For the clean signal s, data from two sources may be combined. To be able to use this large and varied dataset, two models may be trained on the LibriSpeech dataset described above. The first model may be a speech enhancement model that also does full dereverberation that is trained to estimate the reverb-only portion h*s−s, along with the clean signal s and noise n. This model uses the same architecture as discussed with regard to FIG. 4, but may use fewer filters, and early stopping to avoid overfitting. This model may be used to estimate the direct-to-reverberant ratio (DRR) of each clip in a training data set, like VoxCeleb2, and filter out clips with DRR less than a threshold (e.g., 30 dB), as discussed at 310 and 320 in FIG. 3. Various models may be used to estimate h*s and n only, in some embodiments. This denoise-only model may be used to filter out all clips with signal-to-noise ratio (SNR) less than a threshold (e.g., 10 dB), and use its clean speech estimates as training data for operations.

For noise data, the AudioSet dataset may be filtered, selecting clips with tags from the AudioSet ontology that are sounds that a speech enhancement system would be expected to remove, while excluding any clips with tags related to sounds that humans make. It may be that even though most AudioSet tags correspond to non-stationary noise categories, a random 1-second chunk may be used in training that will more often than not have no non-stationary noise. For each chunk, the energy levels in windows (e.g., 50 ms) may be computed, and upsampled, during training, chunks that have a standard-deviation of windowed energy of at least some amount (e.g., 3 dB). This may increase the prevalence of non-stationary noise during training, in some embodiments.

In various embodiments, loss functions for training the convolutional neural model may be described as follows. The convolutional neural network model may be trained by optimizing, for each target y, the loss function $$L(y,\hat{y}) = \lambda_{audio} L_{audio}(y,\hat{y}) + \lambda_{spectral} L_{spectral}(Y,\hat{Y}),$$

where the audio loss is the L2 loss, $$L_{audio}(y,\hat{y}) = |y - \hat{y}|$$

For the spectral loss function $L_{spectral}$, let $Y_{t,f} = |\text{STFT}(y)_{t,f}|$ and $\hat{Y}_{t,f} = |\text{STFT}(\hat{y})_{t,f}|$ be the STFT bin magnitudes. This may be $$\mathcal{L}_{spectral} = \sum_{t,f} w(f)\left(\lambda_{over} 1_{\hat{Y} \geq Y_{t,f}} + \lambda_{under} 1_{\hat{Y} < Y_{t,f}}\right)|Y_{t,f} - \hat{Y}_{t,f}|$$

Here, w is a frequency-weighting function, and $$1_{\hat{Y} \geq Y_{t,f}}$$

is the characteristic function with value 1 if $\hat{Y}_{t,f} \geq Y_{t,f}$, and value 0 otherwise. The variables $\lambda_{over}$ and $\lambda_{under}$ bias the model for overestimation or underestimation of the speech magnitude.

In various embodiments, an inference time mechanism may be described as follows. For low-latency evaluation, input frames (e.g., 40 ms-sized and 640 samples at 16 kHz) may be used with one-frame look-ahead, in some embodiments. For each input chunk of samples, the convolutional neural network model may be run on a last number (e.g., 16384) of samples in the input buffer. Cross-over may be used to eliminate artifacts from the frames, in some embodiments.

Figure 5:
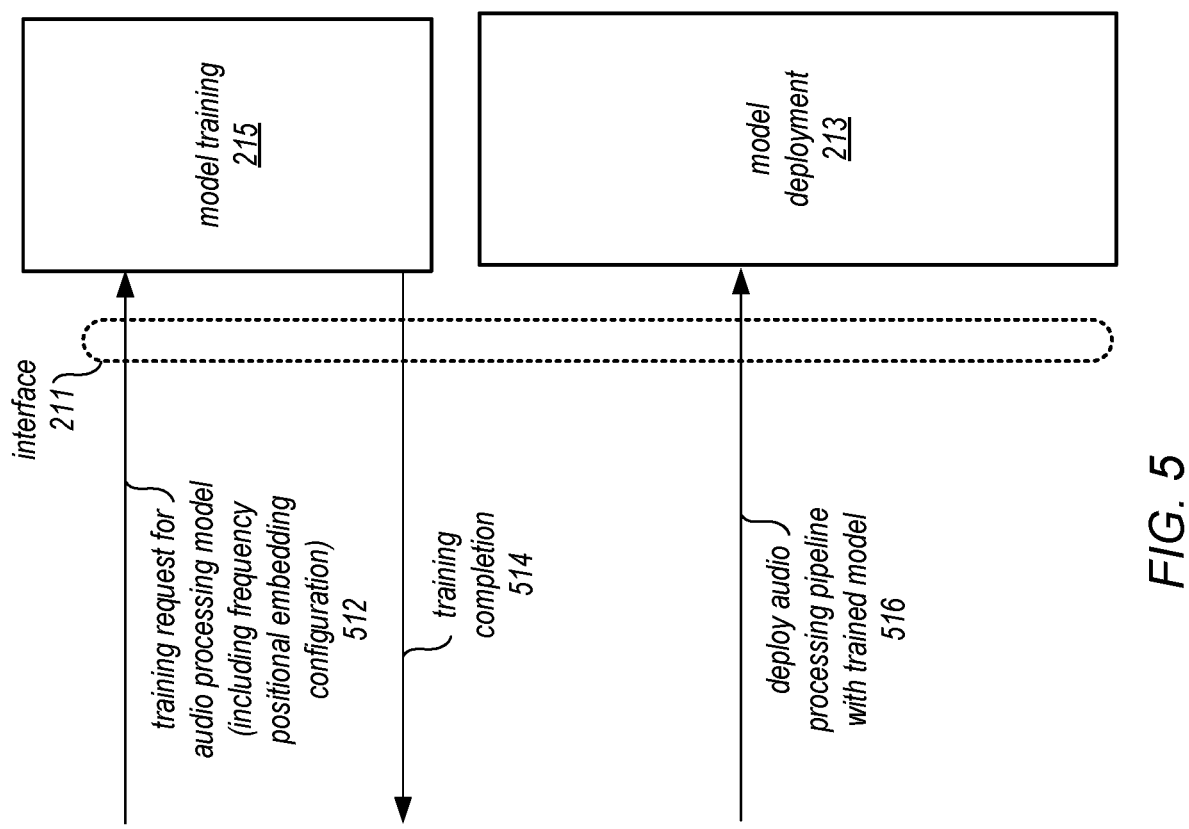
FIG. 5 illustrates interactions with a machine learning service to train and deploy a convolutional neural network that concatenates frequency-positional embeddings, according to some embodiments.

Machine learning service 210 may allow for users, client applications, or other entities to interact with, train, and deploy machine learning models for audio processing tasks. FIG. 5 illustrates interactions with a machine learning service to train and deploy a convolutional neural network that concatenates frequency-positional embeddings, according to some embodiments. As indicated at 512, interface 211 may support training requests for an audio processing model, such as the convolutional neural network discussed above with regard to FIGS. 1 and 4. Various features of training may be specified, including the various features to perform training data set filtering and various augmentations, as discussed above with regard to FIGS. 3 and 4. In at least some embodiments, interface 211 may support configuration of frequency-positional embeddings. For example, the number of embeddings (e.g., k value) may be specified. In some embodiments, different embedding determination techniques may be selectable (e.g., different operations on frequency and/or time, such as cosine, sine, etc.). Model training 215 may launch, provision, or obtain the resources (e.g., nodes) to perform training of a convolutional neural network model that concatenates frequency-positional embeddings. When training is complete, an indication of completion 514 may be provided.

As indicated at 516, interface 211 may support a request to deploy an audio processing pipeline with a trained convolutional neural network that concatenates frequency-positional embeddings, in some embodiments. For example, a request to deploy the audio processing pipeline as a network-endpoint that can be invoked in response to audio data sent to the network endpoint may be received. In some embodiments, deployment of the audio processing pipeline may include installing, storing, or sending the trained convolutional neural network to a specified location for execution.

Although FIGS. 2-5 have been described and illustrated in the context of a provider network implementing an machine learning service, the various components illustrated and described in FIGS. 2-5 may be easily applied to other systems that implement audio processing (e.g., audio enhancement for audio transmission services). As such, FIGS. 2-5 are not intended to be limiting as to other embodiments of convolutional neural network with positional embeddings for audio processing.

Figure 6:
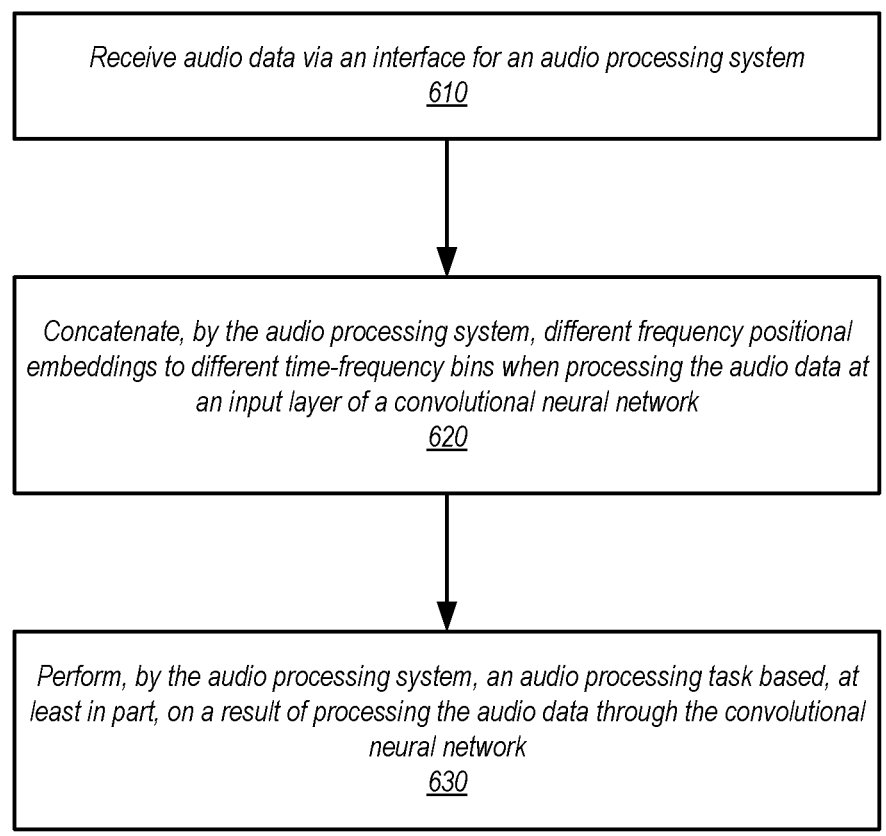
FIG. 6 illustrates a high-level flowchart of various methods and techniques to convolutional neural network with positional embeddings for audio processing, according to some embodiments.

FIG. 6 illustrates a high-level flowchart of various methods and techniques to convolutional neural network with positional embeddings for audio processing, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, audio data may be received via an interface for an audio processing system, in various embodiments. For example, an audio processing system may be implemented as part of network-based service, as discussed above in FIG. 2 or another type of audio processing system (e.g., stand-alone) or embedded within a larger application.

As indicated at 620, different frequency positional embeddings may be concatenated to different time-frequency bins when processing the audio data at an input layer of a convolutional neural network, in various embodiments. For example, as discussed above with regard to FIGS. 1 and 4, frequency positional embeddings may be a vector of frequency positional embeddings that is concatenated to each time (t) frequency (f) bin at the input layer of the model. In this way, early convolutional layers may be able to do frequency-aware processing. The convolutional neural network may be implemented and trained according to the various techniques discussed above with regard to FIGS. 3 and 4. For example, in various embodiments, the convolutional neural network may be a 2D U-net model. In various embodiments, pre-processing such as training data set filtering based for clean training data as well as various augmentations may be performed.

As indicated at 630, an audio processing task may be performed by the audio processing system based, at least in part, on a result of processing the audio data through convolutional neural network, in various embodiments. For example, for audio enhancement tasks, various other operations, such as signal reconstruction (e.g., an inverse STFT) in order to generate an enhanced version of audio data may be performed.

In some embodiments, the audio processing task may be based on a classification or event detection result and confidence value determined by the convolutional neural network, which may be used to provide an indication of the classification or event if the confidence value exceeds a confidence threshold.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
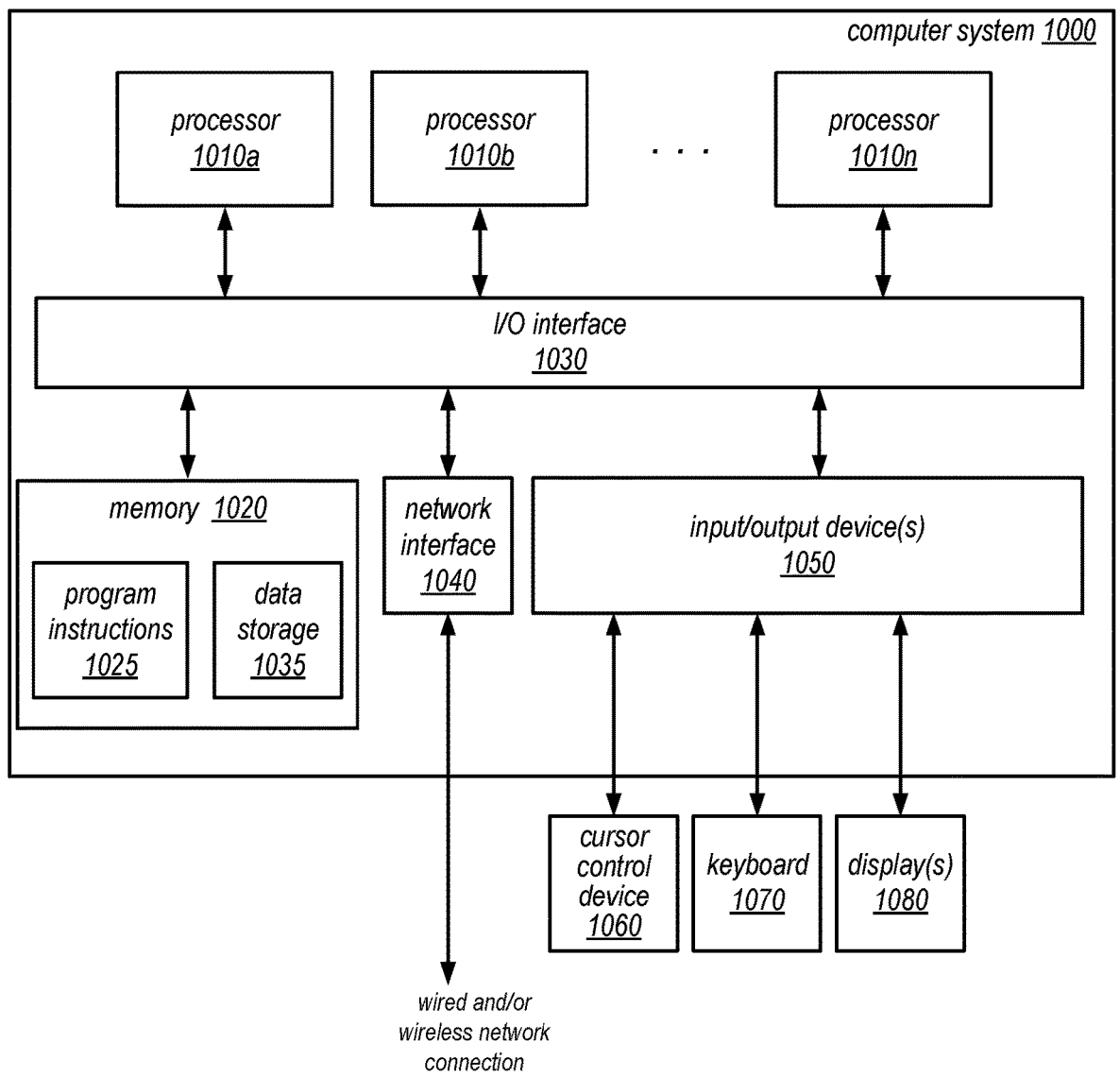
FIG. 7 illustrates an example system to implement the various methods, techniques, and systems described herein, according to some embodiments.

Embodiments of convolutional neural network with positional embeddings for audio processing as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as convolutional neural network with positional embeddings for audio processing as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to:
receive audio data via an interface for an audio processing system;
perform, by the audio processing system, a transform on the audio data to determine a plurality of different spectrum bands of the audio data;
process, by the audio processing system, the plurality of different spectrum bands of the audio data through a convolutional neural network that concatenates different respective vectors of frequency positional embeddings centered at different respective time-frequency bins at an input layer to the different respective time-frequency bins for the plurality of different spectrum bands; and
provide, via the interface of the audio processing system, an enhanced version of the audio data generated based, at least in part, on the processing of the audio data through the convolutional neural network.

2. The system of claim 1, wherein the different respective frequency positional embeddings are configured according to a request received at a training system for the convolutional neural network.

3. The system of claim 1, wherein the convolutional neural network is trained using a training data set that is filtered according to an estimated reverberation respectively determined for different items in the training data set.

4. The system of claim 1, wherein the audio processing system is hosted as part of a machine learning service offered by a provider network and wherein the audio processing system is deployed by the machine learning service in response to a request to deploy an audio processing pipeline that includes the convolutional neural network received at the machine learning service.

5. A method, comprising:
receiving audio data via an interface for an audio processing system;
concatenating, by the audio processing system, different vectors of respective frequency positional embeddings centered at different respective time-frequency bins to the different respective time-frequency bins when processing the audio data at an input layer of a convolutional neural network; and
performing, by the audio processing system, an audio processing task based, at least in part, on a result of processing the audio data through the convolutional neural network.

6. The method of claim 5, wherein the different respective frequency positional embeddings are configured according to a request received at a training system for the convolutional neural network.

7. The method of claim 5, wherein the convolutional neural network is trained using a training data set that is filtered according to an estimated reverberation respectively determined for different items in the training data set.

8. The method of claim 5, wherein the convolutional neural network is trained using a training data set that is modified to add reverberation.

9. The method of claim 5, wherein the convolutional neural network is a 2-dimensional (2D) U-Net model.

10. The method of claim 5, wherein the convolutional neural network is trained using a training data set that is modified according to one or more equalization filters.

11. The method of claim 5, wherein the audio processing task generates an enhanced version of the audio to send to a destination.

12. The method of claim 5, wherein the audio processing task provides a classification of the audio data determined by the convolutional neural network responsive to determining that a confidence value determined for the classification exceeds a threshold.

13. The method of claim 5, wherein the audio processing system is hosted as part of a machine learning service offered by a provider network and wherein the audio processing system is deployed by the machine learning service in response to a request received at the machine learning service.

14. One or more non-transitory, computer-readable storage media, storing program instructions that when executed on or across one or more computing devices cause the one or more computing devices to implement an audio processing pipeline, wherein the audio processing pipeline implements:
receiving audio data;
performing a transform on the audio data to determine a plurality of different spectrum bands of the audio data;
processing the plurality of different spectrum bands of the audio data through a convolutional neural network that concatenates different respective vectors of frequency positional embeddings centered at respective time-frequency bins at an input layer to the different respective time-frequency bins for the plurality of different spectrum bands; and
performing an audio processing task based, at least in part on, a result of processing the audio data through the convolutional neural network.

15. The one or more non-transitory, computer-readable storage media of claim 14, wherein the convolutional neural network is trained using a training data set that is filtered according to an estimated reverberation respectively determined for different items in the training data set.

16. The one or more non-transitory, computer-readable storage media of claim 14, wherein the audio processing task is performing source separation within the audio data.

17. The one or more non-transitory, computer-readable storage media of claim 14, wherein the different respective frequency positional embeddings are configured according to a request received at a training system for the convolutional neural network.

18. The one or more non-transitory, computer-readable storage media of claim 14, wherein the convolutional neural network is trained using a training data set that is modified according to one or more equalization filters.

19. The one or more non-transitory, computer-readable storage media of claim 14, wherein the convolutional neural network is trained using a training data set that is modified to add reverberation.

20. The one or more non-transitory, computer-readable storage media of claim 14, wherein the audio processing task provides a classification of the audio data determined by the convolutional neural network responsive to determining that a confidence value determined for the classification exceeds a threshold.

* * * * *